Dec. 19, 1922.

J. F. TEETER.
CRANK ALIGNER.
FILED AUG. 24, 1921.

1,439,276

Inventor
James F. Teeter

By
Attorneys

Patented Dec. 19, 1922.

1,439,276

UNITED STATES PATENT OFFICE.

JAMES F. TEETER, OF CHICAGO, ILLINOIS.

CRANK ALIGNER.

Application filed August 24, 1921. Serial No. 494,753.

*To all whom it may concern:*

Be it known that I, JAMES F. TEETER, a citizen of the United States, residing at Chicago, in the county of Cook and State of Illinois, have invented new and useful Improvements in Crank Aligners, of which the following is a specification.

This invention relates to devices for testing cranks to ascertain whether they are in parallelism with their shaft, and its object is to provide a very simple and efficient device which will accurately indicate the deflection, if any, of the crank from the shaft axis.

Figure 1:
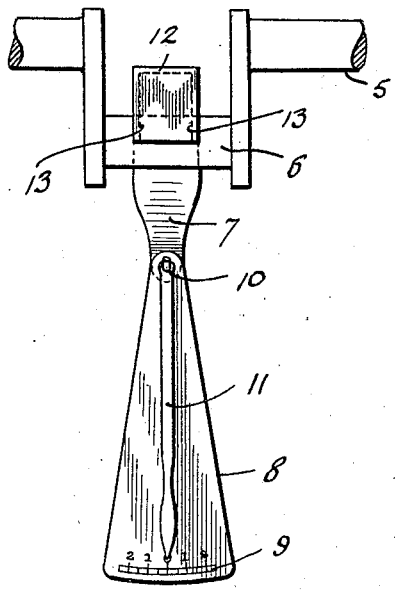
Figure 2:
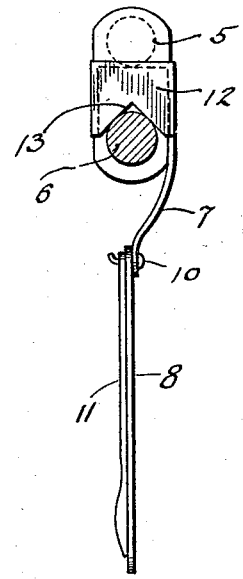
Figure 3:
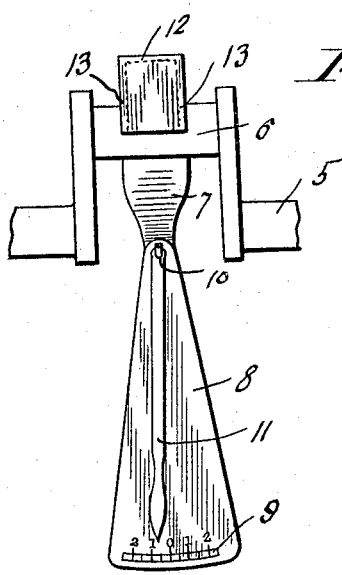

The object stated is attained by means of a novel combination and arrangement of parts to be hereinafter described and claimed, and in order that the same may be better understood, reference is had to the accompanying drawing in which, Figure 1 is a front elevation of the device illustrating how it is used; Fig. 2 is a side elevation, and Fig. 3 is view similar to Fig. 1 showing the parts in another position.

Referring specifically to the drawing, 5 denotes a fragment of a shaft provided with a crank 6. For testing the crank to ascertain whether its axis is parallel to the shaft, the device illustrated has been provided, the same consisting of a supporting member 7 having pivoted to its lower end a blade 8 provided near its bottom edge with a scale of graduations 9 arranged in a curve having for its center the pivot 10 of the blade. This pivot is fashioned into a small hook, as shown in Fig. 2, on which is hung pivotally, to swing freely, a pointer 11 which extends downwardly along the face of the blade 8 and has its lower end positioned to indicate on the scale 9.

The supporting member 7 is a sheet metal strip having a head 12 at the top, on the bottom of which are V-shaped end recesses 13 spaced in the direction of the length of the crank 6.

In use the crank 6 is placed at the bottom center position as shown in Fig. 1 and the device is hung on the crank by the head 12, with the crank seating in the recesses 13. The blade 8 is now adjusted so that the zero mark of the scale 9 registers with the extremity of the pointer 11. The blade 8 works sufficiently tight on the pivot 10 so that it will remain in whatever position it may be set. The shaft 5 is next given a half revolution to place the crank 6 at the top center position. The device is allowed to remain on the crank, and if, after the crank has been placed in the last-described position, the pointer 11 has swung away from the zero mark of the scale 9, this will indicate that the crank is not parallel to the shaft axis, the degree of deviation being denoted on the scale.

However, if the pointer 11 still indicates on the zero mark of the scale, this will indicate that the crank is parallel to the shaft axis, the initial position of the blade 8 relative to the pointer not having changed, due to the fact that it remains in whatever position it may have been initially set, as pointed out hereinbefore.

I claim:

1. A crank testing device comprising a member having means whereby it may be hung on a crank in pendent position, a graduated blade supported by the said member for angular adjustment about a horizontal axis, and an indicator for the graduations on the blade consisting of a pointer which is pivoted to swing freely and has its axis coinciding with the axis of the graduated blade.

2. A crank testing device comprising a member having means whereby it may be hung on a crank in pendent position, an indicator pivoted to swing freely, and a graduated blade carried by the aforesaid member, and adjustable about a horizontal axis relative to the indicator to locate the graduations in a predetermined position with respect to the indicator, the axes of the blade and the indicator coinciding.

3. A crank testing device comprising a member having means whereby it may be hung on a crank in pendent position, an indicator pivoted to swing freely, and a graduated blade carried by the aforesaid member, and adjustable about a horizontal axis relative to the indicator to locate the graduations in a predetermined position with respect to the indicator, the axes of the blade and the indicator coinciding, and being carried by the pendent member.

In testimony whereof I affix my signature.

JAMES F. TEETER.